United States Patent
Lasson et al.

(12)

(10) Patent No.: US 6,271,294 B1
(45) Date of Patent: *Aug. 7, 2001

(54) POLYMER COMPOSITIONS INTENDED FOR THE MANUFACTURE OF PIPES FOR CONVEYING HYDROCARBONS AND ARTICLES BASED ON THESE COMPOSITIONS

(75) Inventors: Pierre Lasson, Brussels; Yves-Julien Lambert, Chaumont-Gistoux; Yves Vanderveken, Leuven; Nestor Maquet, Waha, all of (BE)

(73) Assignee: Solvay (Société Anonyme), Brussels (BE)

( * ) Notice: Subject to any disclaimer, the term of this patent is extended or adjusted under 35 U.S.C. 154(b) by 0 days.

This patent is subject to a terminal disclaimer.

(21) Appl. No.: 08/188,417

(22) Filed: Jan. 24, 1994

(30) Foreign Application Priority Data

Jan. 25, 1993 (BE) .................................. 09300069

(51) Int. Cl.$^7$ ........................................ C08J 91/00
(52) U.S. Cl. .................. 524/314; 524/544; 524/545; 524/546; 525/199
(58) Field of Search ..................... 524/314, 544, 524/545, 546; 525/199

(56) References Cited

U.S. PATENT DOCUMENTS 3,538,028  11/1970  Morgan .................. 260/23
3,760,724 * 9/1973 Budzinski et al. ................ 524/143
4,200,568   4/1980 Trautvetter et al. .............. 260/42.47
4,625,005 * 11/1986 Miyabayashi ..................... 526/273
5,006,377 * 4/1991 Delcorps et al. ................. 428/34.7
5,427,008 * 6/1995 Ueba et al. ....................... 84/297
5,429,849 * 7/1995 Lasson et al. ..................... 525/199

FOREIGN PATENT DOCUMENTS

0166385A2  1/1986 (EP).

* cited by examiner

Primary Examiner—Peter D. Mulcahy
(74) Attorney, Agent, or Firm—Venable; Marina V. Schneller

(57) ABSTRACT

Polymer compositions based on vinylidene fluoride resins which are particularly suitable for the manufacture of pipes for conveying hot hydrocarbons under pressure, comprising by weight;

(A) from 60 to 80% of at least one PVDF homopolymer;
(B) from 20 to 40% of at least one thermoplastic copolymer of vinylidene fluoride ($VF_2$) and of at least one other fluoramonomer (for example hexafluoropropylene, chlorotrifluoroethylene or trifluoroethylene), containing approximately from 5 to 25% of this other monomer; and
(C) a plasticizer, in proportions of 5 to 20% [relative to the total weight of the polymers (A) and (B)], preferably dibutyl sebacate or a polyester of molecular mass of between 1500 and 5000.

5 Claims, No Drawings

US 6,271,294 B1

POLYMER COMPOSITIONS INTENDED FOR THE MANUFACTURE OF PIPES FOR CONVEYING HYDROCARBONS AND ARTICLES BASED ON THESE COMPOSITIONS

FIELD OF THE INVENTION

The present invention relates to particular polymer compositions based on fluoropolymers, making it possible to produce pipes or other articles capable of withstanding extremely severe conditions of use, such as those encountered in the offshore petroleum industry. It also relates to pipes and other articles manufactured from these compositions.

TECHNOLOGY REVIEW

The materials used in the exploitation of petroleum deposits situated at sea are subjected to extreme conditions, in particular the pipes employed for conveying the hydrocarbons thus extracted. In fact, hydrocarbons are generally conveyed at high temperature (of the order of 135° C.) and high pressure (for example 700 bars). Acute problems of mechanical strength and thermal and chemical resistance of the materials arise, therefore, when the plants are operating. To these are added other requirements before or after the use: thus, during their installation or their removal (unreeling-reeling), the pipes may be subjected to impacts, which they must withstand down to very low temperatures (for example −35° C.), and to high distortions. A deformability of at least 7% is considered to be necessary to allow an (un)reeling which is not detrimental to the pipes. Finally, it is important that the properties of the pipes should remain virtually constant with the passage of time, in order to provide them with a long lifetime and possibly to enable them to be reused.

To try to meet all these short-term and long-term requirements, various types of pipes have already been proposed, generally comprising one or a number of metal components guaranteeing the mechanical rigidity, for example a spiral-wound steel tape, as well as various layers based on polymeric compositions ensuring the leak-proofing and the thermal screening in particular. These polymeric compositions may be, for example, polyethylene-based, but this choice restricts the temperature of use of the pipes to less than 100° C. They can also be based on fluoropolymers such as PVDF (polyvinylidene fluoride), which increases the maximum temperature of use and gives them an excellent chemical resistance. However, PVDF is very rigid and must therefore be plasticized, and this then presents the problem of the extraction of plasticizers by the hydrocarbons conveyed, which presents the risk of gradually resulting in a loss of the advantageous properties brought about by the plasticization, thus restricting the lifetime of the pipes and their reuse.

Finally, additional requirements appear when the manufacture of the pipes in question is envisaged. Thus, it is obviously desirable that the workability of the polymeric compositions should be as good as possible and that they should therefore be of moderate viscosity. However, in the case of pipes comprising a spiral-wound steel tape it is desirable that the production of a polymeric coating in contact with this spiral-wound tape should not be excessively perturbed by the presence of interstices between the turns. In fact, during the manufacture of the pipes projections of resin ("sagging") may be produced in these interstices, constituting inhomogeneities and therefore potential failure initiators. It is preferable for this purpose that the composition employed should not have a viscosity that is too low.

Thus, in Patent Application EP 166,385 (Furukawa Electric Co. Ltd.) a solution which overcomes some of these problems is proposed. This document describes a multilayer pipe of particular structure capable in particular of being employed in the petroleum industry, comprising inter alia a spiral-wound steel tape and an adjacent layer consisting of a polymeric composition of specified properties, based on a PVDF copolymer. A copolymer obtained from $VF_2$ (vinylidene fluoride) containing from 5 to 10% (molar) of HFP (hexafluoro-propylene) is recommended because it improves the flexibility of the pipes thus formed. However, no attention is paid to the mechanical properties at low temperature. To prevent the interstices between the metal turns giving rise to the problems described above (sagging) it is furthermore recommended to provide an additional layer of plastic tape between the metal turns and the above-mentioned polymeric layer.

In Belgian Patent 832,851 (Dynamit Nobel A.G.), which also relates to a PVDF-(elastomeric) fluoro-copolymer (for example $VF_2$-HFP) mixture, in order to give it high resilience and elongation at break without excessively affecting its heat resistance (the Vicat point), it is strongly recommended to crosslink the elastomer and optionally then to postcure the articles thus produced. These operations naturally require the use of special additives (crosslinking agents, vulcanization accelerators) and additional stages of manufacture. Furthermore, this document advises against exceeding a copolymer weight content of more than 30%.

SUMMARY OF THE INVENTION

The present invention is aimed at providing a polymeric composition with improved mechanical properties at low and elevated temperatures, which in the course of use retains a flexibility and a resilience which are sufficient in the service temperature range and which furthermore dispenses with the use of an additional layer of plastic tape intended to prevent the sagging and with resorting to crosslinking.

DETAILED DESCRIPTION OF THE INVENTION

In the present case the invention relates to polymer compositions based on PVDF homopolymer and on fluorocopolymer(s), comprising, by weight:
(A) approximately from 60 to 80% of at least one PVDF homopolymer;
(B) approximately from 20 to 40% of at least one thermoplastic copolymer of vinylidene fluoride ($VF_2$) and of at least one other fluoromonomer, present in this copolymer in weight proportions of approximately 5 to 20%;
(C) approximately from 5 to 20% [relative to the total weight of the polymers (A) and (B)] of at least one monomeric or polymeric plasticizer.

More precisely, the compositions of the invention comprise a mixture of $VF_2$ polymers which contains, by weight:
(a) at least one PVDF homopolymer (A), in the proportions of at least approximately 60%, preferably of at least 65%, and not exceeding approximately 80%, preferably 75%; and
(b) at least one thermoplastic copolymer (B) of $VF_2$ and of at least one other fluoromonomer (comonomer), this other monomer being present in this copolymer in weight proportions of at least approximately 5%, preferably of at least 8%, and not exceeding approximately 25%, preferably 20%, particularly preferably 16%. Fluoro-comonomers which give very good results are HFP (hexafluoropropylene) and CTFE (chlorotrifluoroethylene). HFP gives excellent results. TrFE (trifluoroethylene) can also be employed. The weight content of this copolymer (B) in the compositions is at least approximately 20%, preferably at least 25%, and does not exceed approximately 40%, preferably 35%; as well as (c) at least one plasticizer (C) in proportions of approximately 5 to 20%. All these proportions are expressed relative to the total weight of the polymers (A) and (B).

By virtue of the incorporation, according to the invention, of the copolymer (B) and of the plasticizer (C) in the homopolymer (A) a plasticizing effect is observed which is permanent at ambient and higher temperatures and, furthermore, an improvement in the mechanical properties at low temperatures. To this end, it is indispensable that the copolymer (B) should be thermoplastic (that is to say, at least in the present context, semicrystalline), and nonelastomeric. An "elastomeric" copolymer is intended to denote, as defined by the ASTM in the Special Technical Publication No. 184, a material that can be stretched, at ambient temperature, to twice its initial length and which, once released, quickly recovers its initial length to within 10%. Although it may appear surprising that the addition of a thermoplastic copolymer should lead to better plasticization than the addition of an elastomeric copolymer, the examples given below confirm that only the use of a thermoplastic copolymer (B) induces a significant plasticization effect, in contrast to the use of an elastomeric $VF_2$ copolymer. It is thus observed that an elastomeric copolymer of this type is immiscible with PVDF, gives rise only to the improvement in the impact strength and gives a two-phase system (nodules of copolymer within a rigid homopolymer matrix). On the other hand, the compositions according to the invention can be considered as the result of a cocrystallization, and are single-phase. An unexpected and particularly important advantage of such a mixture of homopolymer (A) and of copolymer (B) is that it exhibits a synergistic effect when compared with a simple copolymer insofar as its melting temperature and its creep resistance at high temperature (reflected, for example, in its Vicat point) are concerned. It appears, in fact, that the melting temperature is markedly higher in the case of a composition according to the invention than in that of a copolymer alone, at equal overall comonomer content.

An additional condition which the thermoplastic copolymer (B) described above must preferably fulfil concerns its molecular weight or, more conveniently, its melt index.

The copolymer (B) of the composition according to the invention preferably has a melt index (MFI measured at 230° C. under 10 kg) lower than approximately 6 g/10 min, ideally lower than 5.5 g/10 min. This upper limit is desirable because it appears that a viscosity that is too low is accompanied by a rise in the brittleness temperature. The lower limit, for its part, is not critical and its only purpose is to improve the workability of the compositions: in general, copolymers (B) whose MFI is at least approximately 4 g/10 min are chosen. For this same reason of workability, homopolymers whose MFI (under the same conditions) is at least approximately 0.5 g/10 min are generally employed. In fact, the MFI of the homopolymer employed in a composition of the invention is essentially chosen as a function of the MFI of the copolymer and of the relative proportions of these two types of polymers, so that the MFI of the composition preferably does not exceed approximately 1 g/10 min (under the abovementioned conditions of measurement).

The addition of an appropriate "low temperature" plasticizer to the homopolymer-thermoplastic copolymer mixture, in proportions which are generally of at least approximately 5% [relative to the total weight of the polymers (A) and (B), that is to say more than 5 kg of plasticizer per 100 kg of unplasticized polymeric material], preferably of at least 8%, and not exceeding approximately 20%, preferably 15%, makes it possible to improve the low-temperature behaviour of the compositions. A proportion of plasticizer of approximately 10% gives highly satisfactory results. A plasticizer which has shown itself to be particularly advantageous within the context of the present invention is DBS (dibutyl sebacate: $C_4H_9$—COO—$(CH_2)_8$—COO—$C_4H_9$). Other effective plasticizers are polymeric polyesters such as those derived from adipic, azelaic or sebacic acids and diols, and their mixtures, but on condition that their molecular mass is at least approximately 1500, preferably at least 1800, and not exceeding approximately 5000, preferably lower than 2500. Polyesters of excessively high molecular mass result, in fact, in compositions of lower impact strength.

The DBS and the abovementioned polyesters are incorporated without any difficulty in the mixtures of fluoropolymers (A) and (B) defined above and produce compositions whose impact strength is satisfactory.

It has been found, furthermore, that the compositions of the invention resist deplasticization much better than a plasticized single homopolymer.

The compositions of the invention may additionally contain conventional additives such as filling materials, pigments, fibre reinforcements, electrically conductive particles and the like.

The compositions of the invention can be obtained by any of the usual techniques for preparing polymeric compositions, especially by premixing the various polymers in the form of powders or granules (as well as optionally with the other additives or filling materials) in the desired proportions, before they are subjected to a thermomechanical processing technique such as extrusion, injection moulding and the like.

This operating method can be applied either with a view to manufacturing finished products such as, for example, pipes, or, by adding a granulation stage thereto, with a view to having available granules containing the desired polymers, additives and fillers in the suitable proportions, thus facilitating a subsequent conversion into finished products.

For the reasons set out above, the compositions according to the invention show themselves to be particularly suitable for the manufacture, especially by extrusion, of pipes subjected to severe use conditions, in particular pipes intended for conveying hot hydrocarbons under pressure, but this represents only one of their potential applications, other articles manufactured from these compositions forming the subject of the present invention just as well as pipes.

The present invention is also aimed at providing pipes and other articles with a number of layers at least one of which consists of a composition in accordance with the invention. Such multilayer articles can be manufactured by many known techniques, such as coextrusion.

EXAMPLES

The examples whose description follows are used to illustrate the invention. Tests 12, 13 and 15 are carried out according to the invention.

Examples 1R to 7R

Plasticization of PVDF homopolymer

In examples 2R to 4R samples of PVDF homopolymer (Solef® 1010) have been plasticized with three different plasticizers, present each time in weight proportions of 10:90 relative to PVDF (DOS=dioctyl sebacate; BBSA=butylbenzenesulfonamide). Example 1R relates to the same PVDF homopolymer unplasticized. Each time, measurements have been made of the elongations at the yield point (Ey) and at break (Eb) at different temperatures (at a speed of 5 mm/min, according to ASTM standard D 638), the Izod impact strength (measured according to ASTM standard D 256, at −35° C.) and the glass transition (Tg) and melting (Tm) temperatures [measured using DMTA (dynamic-mechanical thermal analysis) and DSC calorimetry (differential scanning calorimetry) respectively]. Unless shown otherwise, these same measurement methods will also be employed in the other examples.

TABLE 1

| Examples | 1R | 2R | 3R | 4R |
|---|---|---|---|---|
| Plasticizer | — | DBS | DOS | BBSA |
| Ey at −35° C., % | — | (*) | 4 | 9 |
| Ey at 23° C., % | 7 | (*) | 4 | 11 |
| Eb at −35° C., % | 10(°) | 26 | 5 | 14 |
| Izod impact strength, J/m | 49(°) | 106 | 78 | 73 |
| Tg, ° C. | −32 | −31 | −32 | −31 |
| Tm, ° C. | 174 | 170 | 172 | 168 |

(*) no yield point in this case
(°) measured at −40° C.

Similarly, in Examples 5R to 7R the same PVDF homopolymer was plasticized with three polyesters derived from adipic acid of different molecular masses (MM), both present in proportions of 10:90, and the same measurements were made:

TABLE 2

| Examples | 1R | 5R | 6R | 7R |
|---|---|---|---|---|
| MM of the polyester | — | 2050 | 2270 | 3000 |
| Ey at −35° C., % | — | 6 | 5 | 6 |
| Ey at 23° C., % | 7 | 11 | 8 | 10 |
| Eb at −35° C., % | 10(*) | 16 | 14 | 22 |
| Izod impact strength at −35° C., J/m | 49(*) | 78 | 70 | 48(*) |
| Tg, ° C. | −32 | −29 | −28 | −32 |
| Tm, ° C. | 174 | 173 | 171 | 173 |

(*) measured at −40° C.

Examination of Table 2 reveals the advantage of employing polyesters of limited molecular mass.

Examples 8R to 10R

Miscibility Tests

Composition 8R is a mixture of thermoplastic $VF_2$-HFP copolymer (Solef 21508) and of PVDF homopolymer (Solef 1015) in respective weight proportions of 30:70 (without plasticizer). Compositions 9R and 10R comprise, on the one hand, a PVDF homopolymer (Solef 1010) and, on the other hand, a copolymer based on $VF_2$ and HFP (marketed by du Pont under the trademark Viton®). This Viton copolymer, elastomeric and not thermoplastic as in accordance with the present invention, and two different types of which have been employed (Tests 9R and 10R) is present each time in weight proportions of 25:75 relative to the homopolymer; each of these three compositions (8R, 9R, 10R) thus exhibits comparable proportions of copolymer.

TABLE 3

| Example | 8R | 9R | 10R |
|---|---|---|---|
| Viton copolymers | No | A | B70 |
| Ey at 23° C., % | 13 | 6 | 8 |
| Eb at 23° C., % | 410 | 19 | 37 |
| Tg, ° C. | −30 | −31/−13 | −30/−17 |

In the data of Table 3, the comparison of the elongations at break (Eb) reflects the decohesion of the (heterogeneous) compositions 9R and 10R, and the good cohesion of the (homogenous) composition 8R, which would be in accordance with the invention if it included a plasticizer.

TEM (transmission electron microscopy) photomicrographs produced with magnifications of 2000× and 10000× furthermore confirm the immiscibility of the homopolymer with the copolymers in the case where the latter are elastomeric (Examples 9R and 10R) (the presence of nodules approximately 1 μm in diameter is observed in this case), as well as the good miscibility (absence of nodules) in the contrary case (Example 8R).

DSC tests have furthermore revealed in the case of the composition of Example 8R, the presence of a single melting peak and of a single crystallization peak, which confirms the complete miscibility (cocrystallization) of the homopolymer and of the thermoplastic copolymer.

The two values of Tg shown in the case of Examples 9R and 10R in the above table confirm the presence of two phases, whose Tg values are different.

Examples 11R to 13

Advantages of the Plasticized Homopolymer-thermoplastic Copolymer Mixes over Single Copolymers Comparative Example 11R corresponds to a thermoplastic $VF_2$-HFP copolymer (Solef 11010) containing 10% by weight of HFP, and Examples 12 and 13 to compositions according to the invention, containing PVDF homopolymer (Solef 1015), a thermoplastic $VF_2$-HFP copolymer (Solef 11012) and the plasticizer, in respective weight proportions of 70:30:10. The Vicat point has been measured according to ASTM standard D-1525 (under 5 kg). The plasticizer employed in Example 13 is a polyester of adipic acid with an average molecular mass of 2050, marketed by Ciba-Geigy under the trademark Rheoplex® 904.

TABLE 4

| Example | 11R | 12 | 13 |
|---|---|---|---|
| Plasticizer | — | DBS | Polyester |
| Ey at −35° C., % | — | 9 | 14 |
| Ey at 23° C., % | 10 | 20 | 18 |
| Tm, ° C. | 160 | 169 | 170 |
| Tg, ° C. | −29 | −30 | −29 |
| Vicat Point, ° C. | 96 | 108 | 111 |

In Table 4 it is found that the plasticized homopolymer-(thermoplastic) copolymer mixtures result in a considerable improvement of the thermomechanical properties, when compared with a single copolymer.

Examples 14R and 15

Advantages of the Plasticized Homopolymer—Thermoplastic Copolymer Mixtures over Plasticized Homopolymer Comparative. Example 14R corresponds to a PVDF homopolymer (Solef 1015) plasticized with 10% of DBS, and Example 15 (according to the invention) to a PVDF homopolymer (Solef 1015)/thermoplastic VF$_2$-HFP copolymer (Solef 11012)/DBS composition (in respective proportions of 70:30:10). The following properties were measured after a deplasticization obtained by a residence of 2 hours in an oven at 150° C. The Ey and Eb values were measured at a speed of 50 mm/min according to ASTM standard D 638.

TABLE 5

| Example | 14R | 15 |
|---|---|---|
| Ey at −35° C., % | 5 | 9 |
| Eb at −35° C., % | 10 | 11 |
| Ey at 23° C., % | 7 | 10 |
| Eb at 23° C., % | 40 | 259 |

In table 5 it is found that composition 15 (according to the invention) resists deplasticization markedly better than the plasticized homopolymer (14R) and in particular that the elongation at the yield point (by) at −35° C. is greater than 7%, the minimum value considered to be necessary to permit (un)reeling, as set out above.

What is claimed is:

1. A polymer composition consisting essentially of, by weight:

(A) approximately from 60 to 80% of at least one PVDF homopolymer;

(B) approximately from 20 to 40% of at least one thermoplastic copolymer of vinylidene fluoride and of at least one other fluoromonomer, present in this copolymer in weight proportions of approximately 5 to 25% and (C) approximately from 5 to 20%, of a monomeric or polymeric plasticizer.

2. The composition according to claim 1, wherein said fluoromonomer is hexafluoropropylene, chlorotrifluoroethylene or trifluoroethylene.

3. The composition according to claim 1, wherein said copolymer exhibits a melt index lower than approximately 6 g/10 min.

4. The composition according to claim 1, wherein said plasticizer includes dibutyl sebacate.

5. The composition according to claim 1, wherein said plasticizer includes at least one polyester comprising adipic acid, azelaic acid, or sebacic acid, and a diol, said plasticizer having a molecular mass of approximately 1500 to 5000.

* * * * *